United States Patent
Fujii et al.

(10) Patent No.: US 7,499,496 B2
(45) Date of Patent: Mar. 3, 2009

(54) TRANSMITTER AND TRANSMISSION CONTROLLING METHOD

(75) Inventors: Hiromasa Fujii, Yokosuka (JP); Jiyun Shen, Yokohama (JP); Takahiro Asai, Yokosuka (JP); Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 560 days.

(21) Appl. No.: 11/136,520

(22) Filed: May 25, 2005

(65) Prior Publication Data

US 2005/0265468 A1    Dec. 1, 2005

(30) Foreign Application Priority Data

May 25, 2004    (JP) .............................. 2004-155031

(51) Int. Cl.
*H04K 1/10* (2006.01)
(52) U.S. Cl. ................. 375/260; 375/146; 375/267; 375/295; 370/210; 370/208; 455/522
(58) Field of Classification Search .............. 375/260, 375/267, 146, 295; 370/210, 208, 203; 455/522
See application file for complete search history.

(56) References Cited

U.S. PATENT DOCUMENTS

| | | | | |
|---|---|---|---|---|
| 2002/0159532 A1* | 10/2002 | Wight | .................. | 375/260 |
| 2005/0094552 A1* | 5/2005 | Abe et al. | .................. | 370/208 |
| 2005/0099936 A1* | 5/2005 | Fujii et al. | .................. | 370/203 |
| 2007/0201353 A1* | 8/2007 | Wight | .................. | 370/210 |

FOREIGN PATENT DOCUMENTS

EP    1 357 718 A2    10/2003

OTHER PUBLICATIONS

Leonard J. Cimini, Jr., et al., "Peak-to-Average power ratio reduction of an OFDM signal using partial transmit sequences", IEEE Communication Letters., vol. 4, No. 3, Mar. 2000, pp. 86-88.

Seog Geun Kang, et al., "A Novel subblock partition scheme for partial transmit sequence OFDM", IEEE Trans. on Broadcasting, vol. 45, No. 3, Sep. 1999, pp. 333-338.

Wong Sai Ho, et. al., "Peak-to-Average power reduction using partial transmit sequences: A suboptimal approach based on dual layered phase sequencing", IEEE Trans. on Broadcasting, vol. 49, No. 2, Jun. 2003, pp. 225-231.

A. D. S. Jayalath, et. al., "Reduced complexity PTS and new phase sequences for SLM to reduce PAP of an OFDM Signal", Proc. of IEEE VTC 2000, vol. 3, pp. 1914-1917.

Chintha Tellambura, "Improved Phase Factor Computation for the PAR Reduction of an OFDM Signal Using PTS", IEEE Communications Letters, vol. 5, No. 4, XP-001103123, Apr. 2001, pp. 135-137.

* cited by examiner

*Primary Examiner*—Sudhanshu C Pathak
(74) *Attorney, Agent, or Firm*—Oblon, Spivak, McClelland, Maier & Neustadt, P.C.

(57) ABSTRACT

An OFDM transmitter (100) is disclosed. The OFDM transmitter comprises: a sorter (103-1) for sorting plural input complex signals and partitioning them into plural groups; plural IFFTs (103-2) for performing inverse Fourier transform on the input complex signals in groups; a peak reducer (103-4) for performing peak reduction, based on outputs from at least one of the IFFTs; and a multiple discrete signal generator (103-5) for generating a designated number of discrete signals from outputs of the peak reducer.

7 Claims, 15 Drawing Sheets

TRANSMITTER AND TRANSMISSION CONTROLLING METHOD

BACKGROUND OF THE INVENTION

The present invention generally relates to a transmitter and transmission control method in radio communication.

The OFDM (Orthogonal Frequency Division Multiplexing) transmission system is a promising system since it makes it possible to receive radio signals without interference between codes even under a multi-path environment. A transmission structure employed in the OFDM transmission system is explained with reference to FIG. 1.

A transmitter 1 comprises a symbol generator 2 receiving information bits, a serial-to-parallel (S/P) converter 3 connected to the symbol generator 2, an inverse fast Fourier transformer (IFFT) 4 connected to the S/P converter 3, a parallel-to-serial (P/S) converter 5, a GI adder 6 connected to the P/S converter 5 and an antenna 7 connected to the GI adder.

The information bits are input to the symbol generator 2. Similar to single carrier transmission, the symbol generator 2 performs error correction encoding, interleaving, symbol mapping, etc., on the received information bits to generate transmission symbols, and provides the generated transmission symbols to the S/P converter 3. The S/P converter 3 performs serial-to-parallel conversion of the received transmission symbols, and provides the parallel signals to the IFFT 4. The IFFT 4 converts the input signals to orthogonal multi-carrier signals, and provides the resultant signals to the P/S converter 5. The P/S converter 5 performs parallel-to-serial conversion of the received signals, and provides the serialized signals to the GI adder 6. The GI adder 6 makes a partial copy of the received signals and adds the partial copy to the received signals as a guard interval. The signals accompanied by the guard interval are transmitted via the antenna 7.

The above mentioned OFDM transmission system has a PAPR (Peak to Average Power Ratio) problem, in which signals whose amplitudes are significantly large compared with average amplitude appear in the OFDM modulated signals, which are output signals of the IFFT 4.

This problem is unique to multi-carrier modulation systems. When separately modulated, many carriers are synthesized in the same phase, and the added outputs may become very large and have a peak that is very high compared with the average output. The maximum peak power can be a value of the average power multiplied by the maximum number of used sub-carriers.

A transmission amplifier has a limited linear region where its input and output are linear. When a signal exceeding the linear region is input to the amplifier, an output waveform becomes distorted, resulting in problems such as transmission quality degradation, power radiation to outside of the bandwidth, etc. On the other hand, if the linear region is widened, amplification efficiency becomes lower. Therefore, the amplitude (power) distribution of transmission signals is desired to be rather flat without a high peak. In order to reduce PAPR, a partial transmit sequence (PTS) method and a cyclic shift method are proposed.

Next, a transmitter performing peak reduction is explained with reference to FIG. 2.

The transmitter 1 shown in FIG. 2 has a low peak IFFT unit 8 to which the PTS method or the cyclic shift method is applied, instead of the IFFT 4 used in the above explained transmitter shown in FIG. 1 (See Non-Patent Document #1).

The structure of the low peak IFFT unit 8 is explained below with reference to FIG. 3, in which the input signals are divided or partitioned into two groups for inverse fast Fourier transform.

The low peak IFFT unit 8 comprises partitioned IFFT 8-1, and a peak reducer 8-2 connected to the partitioned IFFT 8-1. The peak reducer 8-2 comprises peak reduction processors 8-21 and 8-22 connected to the partitioned IFFT 8-1, a peak reduction controller 8-23 connected to the partitioned IFFT 8-1 and the peak reduction processors 8-21 and 8-22, and an adder unit 8-24 connected to the peak reduction processors 8-21 and 8-22. The adder unit 8-24 is equipped with plural adders connected to the peak reduction processors 8-21 and 8-22. An output signal from the adder unit 8-24 is input to the P/S converter 5.

In this structure, the partitioned IFFT 8-1 receives plural sub-carriers, divides them into plural groups, for example, $N_G$ groups ($N_G$ is an integer larger than 2), and perform inverse fast Fourier transform (IFFT) on the sub-carriers in groups.

The structure of the partitioned IFFT 8-1 is explained below with reference to FIG. 4, in which 8 point inverse fast Fourier transform is performed divided into two parts.

The partitioned IFFT 8-1 comprises a first IFFT 8-11 and a second IFFT 8-12. When generating time domain signals corresponding to f(0)~f(3), for example, signals on which inverse fast Fourier transform should be performed are input to terminals f(0)~f(3) of the first IFFT 8-11, and zeros are input to terminal f(4)~f(7). In this structure, two IFFTs are used and therefore twice the amount of calculation is needed, compared with no partitioned structure.

The time domain signals output from the first IFFT 8-11 correspond to the sub-carriers f(0)~f(3). The time domain signals output from the second IFFT 8-12 correspond to the sub-carriers f(4)~f(7). In normal IFFTs, the signals from the first and second IFFTs and having the same timing point are added.

In this PAPR method using the cyclic shift method and the PTS method, the peak reduction processors 8-21 and 8-22 perform cyclic shift or phase rotation on these signals [F(0), F(1), ... F($N_{FFT}$-1)], and thereafter the adder unit 8-24 adds them together and outputs the results. The $N_{FFT}$ ($N_{FFT}$ is an integer larger than 1) means the total number of the Fourier transform points. The peak reduction controller 8-23 controls the amount of the cyclic shift or phase rotation so as to lower peaks in the output signals. In this manner, high peak occurrence is suppressed.

When employing the PTS method or the cyclic shift method, the amount of the phase rotation or the cyclic shift should be sent to a receiver as control information. In order to do this, a control signal can be used as disclosed in Non-Patent Documents #3, #4.

[Non-Patent Document #1]

L. J and N. R. Sollenberger, "Peak-to-Average power ratio reduction of an OFDM signal using partial transmit sequences", IEEE Commun. Lett., vol. 4, no. 3, pp. 86-88, March 2000.

[Non-Patent Document #2]

Seog Geun Kang, et. al. "A Novel subblock partition scheme for partial transmit sequence OFDM", IEEE Trans. on Broadcasting vol. 45, no. 3, pp. 333-338. Sep. 1999

[Non-Patent Document #3]

Wong Sai Ho et. al., "Peak-to-average power reduction using partial transmit sequence: a suboptimal approach based on dual layered phase sequencing", IEEE Trans. on Broadcasting, vol. 49, no. 2, pp. 225-231, June 2003

[Non-Patent Document #4]
A. D. S. Jayalath et. al., "Reduced complexity PTS and new phase sequences for SLM to reduce PAP of an OFDM signal", Proc. of IEEE VTC 2000, vol. 3, pp. 1914-1917.

However, the above explained related art examples have the following problems.

When plural sub-carriers are divided into plural groups and receive IFFT processing, the calculation amount required for the IFFT is increased by a multiple of the number of divided groups.

The peak reduction control becomes complicated depending on the number of input symbols.

SUMMARY OF THE INVENTION

A general object of the present invention is to provide a transmitter and transmission controlling method that can efficiently perform inverse Fourier transform and peak reduction.

The above object of the present invention is achieved by an OFDM transmitter (100), characterized by: a sorter (103-1) for sorting a plurality of input complex signals and partitioning them into plural groups; a plurality of IFFTs (103-2) for performing inverse Fourier transform on the input complex signals in groups; a peak reducer (103-4) for performing peak reduction, based on outputs from at least one of the IFFTs; and a multiple discrete signal generator (103-5) for generating a designated number of discrete signals from outputs of the peak reducer.

In the transmitter, when the sorter divides the input $N_{FFT}$ complex signals ($N_{FFT}$ is an integer larger than 1) into $N_G$ groups ($N_G$ is Z (Z is an integer larger than 2) to the power of an integer), the sorter may sort the complex signals defining a remainder operator Mod (sub-carrier number, ($Z^X$)) as a key having the Xth priority (X is a natural number from 1 to $\log_z(N_G)$) and defining the sub-carrier number as a key having the ($\log_z(N_G)$)th priority; and the nth IFFT (n is a natural number) may have $N_{FFT}/N_G$ point input terminals, to which complex signals from (n−1) $N_{FFT}/N_G$ to $nN_{FFT}/N_G-1$ are input.

The multiple discrete signal generator may receive N input signals (N is a natural number) and generate 2N output signals, in a case where the nth input signals to the multiple discrete signal generator are even harmonics of the output signals from the multiple discrete signal generator, the nth input is output as is as the nth output and the (n+N)th output; and in case where the nth input signals to the multiple discrete signal generator are odd harmonics of the output signals from the multiple discrete signal generator, the nth input is output weighted by $W_{2N}^n$ as the nth output, and output weighted by $W_{2N}^{n+N}$ as the (n+N)th output (wherein $W_{2N}^n = \exp(j(2\pi/2N) n)$, $W_{2N}^{n+N} = \exp(j(2\pi/2N)(n+N))$).

The transmitter may be further characterized by: plural multiple discrete signal generators (103-3, 103-5); and plural peak reducers (103-4, 103-6); wherein the multiple discrete signal generators and the peak reducers are arranged in a multistage manner.

The IFFTs may assign sub-carriers to plural users in groups.

Peak reducers receiving no assigned sub-carrier may be made inactive.

The peak reducers are made inactive in order from rear to front.

According to another feature of the present invention, a transmission control method in an OFDM transmitter (100) is provided, which is characterized by the steps of: sorting plural input complex signals; partitioning the sorted complex signals into plural groups; performing inverse Fourier transform on the input complex signals in groups; performing peak reduction, based on at least one group of the inverse Fourier transformed complex signals; and generating a designated sample number of discrete signals from the peak reduced signals.

DESCRIPTION OF THE PREFERRED EMBODIMENTS

Figure 1:
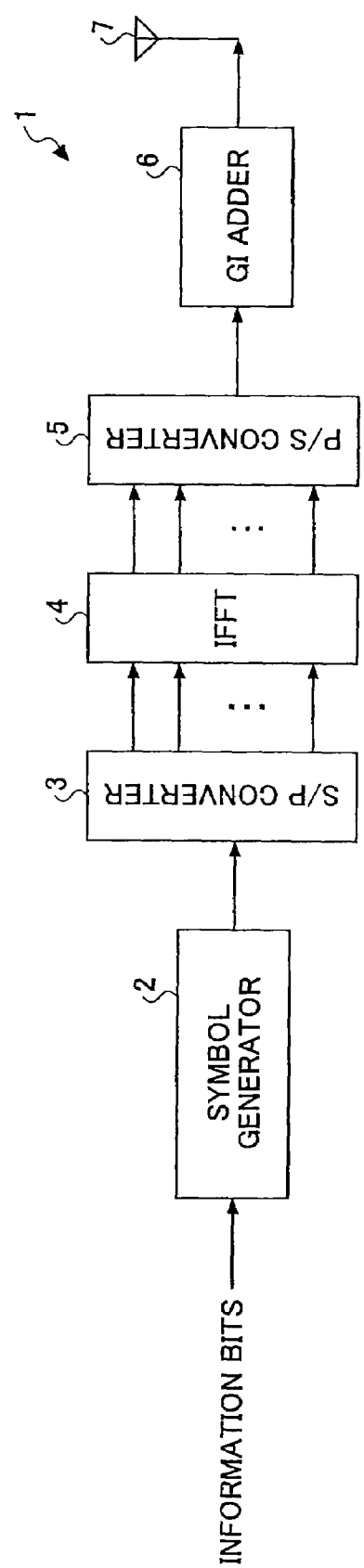
FIG. 1 is a block diagram of an OFDM transmitter.
Figure 2:
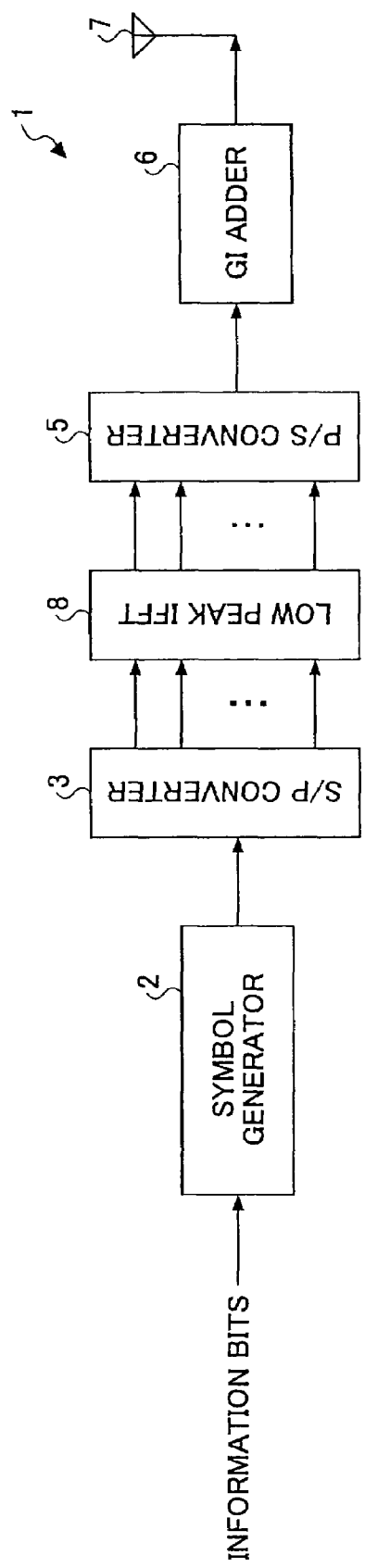
FIG. 2 is a block diagram of an OFDM transmitter that performs peak reduction.

The following is a description of embodiments of the present invention, with reference to the accompanying drawings.

Throughout all the figures, members and parts having the same or similar functions are assigned the same or similar reference numerals or symbols, and redundant explanations are omitted.

Figure 5:
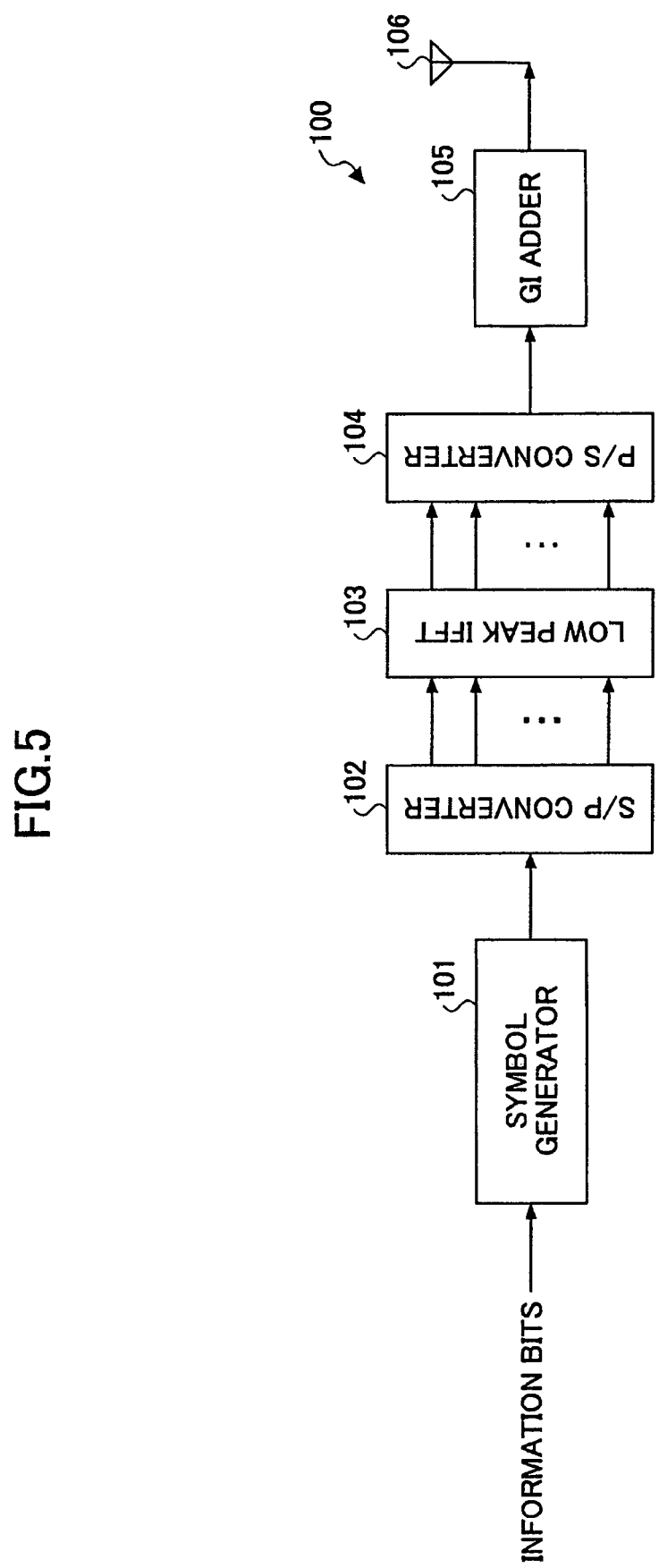
FIG. 5 is a block diagram of a transmitter according to an embodiment of the present invention.

A radio transmitter according to an embodiment of the present invention is explained below with reference to FIG. 5.

A transmitter 100 according to this embodiment comprises a symbol generator 101 receiving information bits, a serial-to-parallel (S/P) converter 102 connected to the symbol generator 101, a low peak inverse fast Fourier transformer (IFFT) 103 connected to the S/P converter 102, a parallel-to-serial (P/S) converter 104, a GI adder 105 connected to the P/S converter 104, and an antenna 106 connected to the GI adder.

The symbol generator 101 performs error correction encoding, interleaving, symbol mapping, etc., on the received information bits to generate transmission symbols, and provides the generated transmission symbols to the S/P converter 102. The S/P converter 102 performs serial-to-parallel conversion of the received transmission symbols, and provides the parallel signals to the low peak IFFT 103. The low peak IFFT 103 divides or partitions the input signals into plural groups, performs inverse fast Fourier transformation and peak reduction on the partitioned signals, and provides the resultant signals to the P/S converter 104. The P/S converter 104 performs parallel-to-serial conversion of the received signals, and provides the serialized signals to the GI adder 105. The GI adder 105 makes a partial copy of the received signals and adds the partial copy to the received signals as a guard interval. The signals accompanied by the guard interval are transmitted via the antenna 106.

Figure 6:
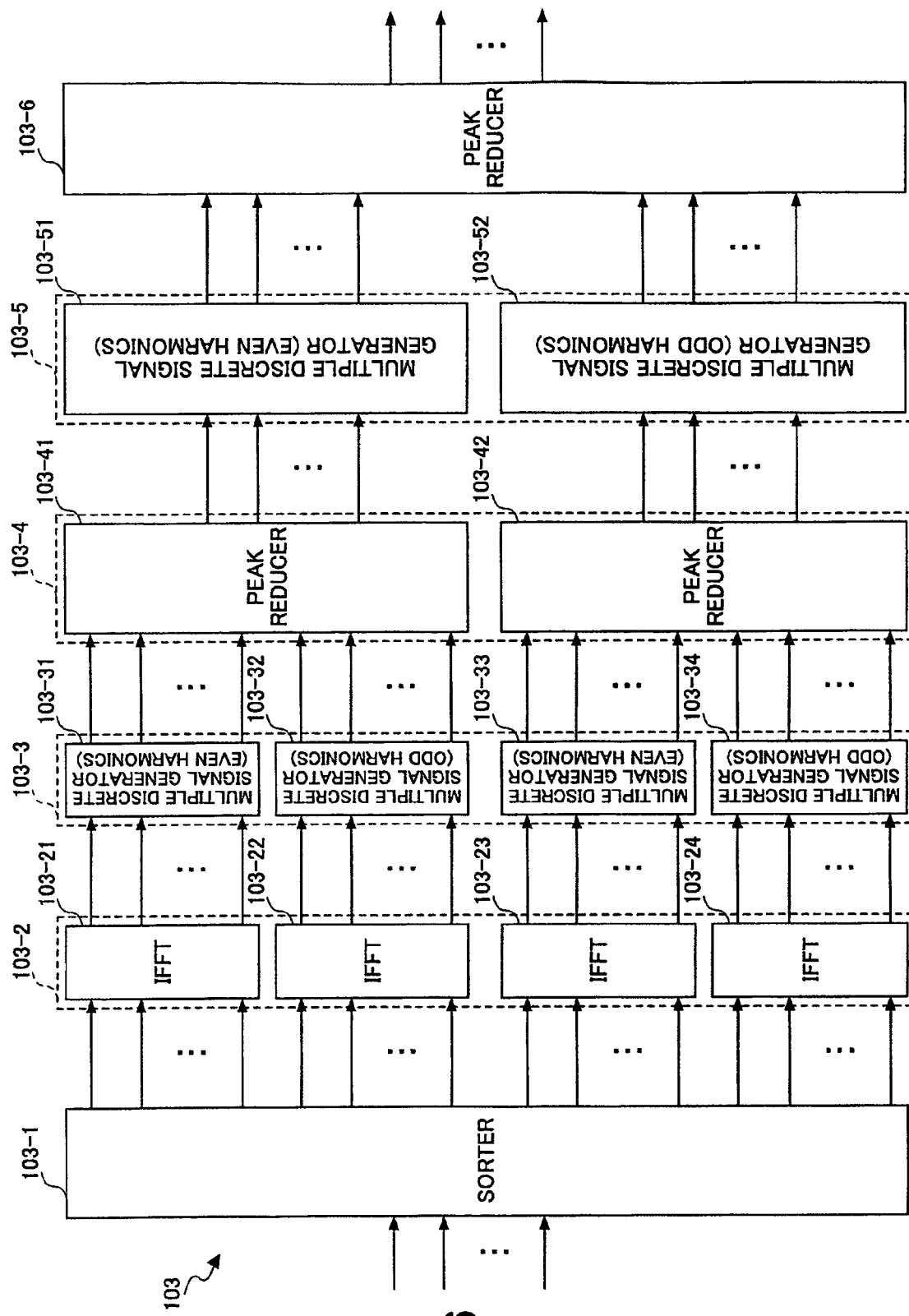
FIG. 6 is a schematic diagram of a low peak IFFT unit according to a first embodiment of the present invention.

Next, the low peak IFFT 103 according to this embodiment is explained in more detail with reference to FIG. 6. The low peak IFFT 103 according to this embodiment comprises a sorter 103-1, a partitioned IFFT unit 103-2 connected to the sorter 103-1, a multiple discrete signal generator unit 103-3 connected to the partitioned IFFT unit 103-2, a peak reducer unit 103-4 connected to the multiple discrete signal generator unit 103-3, a multiple discrete signal generator unit 103-5 connected to the peak reducer unit 103-4, and a peak reducer 103-6 connected to the multiple discrete signal generator unit 103-5.

The partitioned IFFT unit 103-2 comprises, for example, four IFFTs 103-21, 103-22, 103-23 and 103-24. The multiple discrete signal generator unit 103-3 comprises, for example, four multiple discrete signal generators, that is, a multiple discrete signal generator (even harmonics) 103-31, a multiple discrete signal generator (odd harmonics) 103-32, a multiple discrete signal generator (even harmonics) 103-33 and a multiple discrete signal generator (odd harmonics) 103-34, connected to IFFT 103-21, 103-22, 103-23 and 103-24, respectively. The peak reducer unit 103-4 comprises, for example, two peak reducers 103-41, 103-42, connected to the multiple discrete signal generators 103-31, 32 and the multiple discrete signal generators 103-33, 34, respectively. The multiple discrete signal generator unit 103-5 comprises a multiple discrete signal generator (even harmonics) 103-51 and a multiple discrete signal generators (odd harmonics) 103-52, connected to the peak reducers 103-41, 103-42, respectively.

The sorter 103-1 receives and sorts plural complex signals, and divides or partitions them into plural groups. More specifically, in the sorter 103-1, the sorting procedure is done in descending order where a remainder operator Mod (sub-carrier number, $(Z^X)$) is defined as a key having the Xth priority (wherein Z is an integer more than 2 and X is a natural number from 1 to $\log_z(N_G)$), and the sub-carrier number is defined as a key having the (x+1)th priority or the $\log_z(N_G)$ th priority. The sorted results are output via each output terminal.

The $N_G$ (NG is Z to the power of an integer) means the number of divided groups for the received sub-carriers, that is, the number of the IFFTs provided in the IFFT unit 103-2. The following explanation assumes that Z=2. The nth (n is a natural number) IFFT in the IFFT unit 103-2 has $N_{FFT}/N_G$ point input terminals, to which complex signals from (n−1) $N_{FFT}/N_G$ to $nN_{FFT}/N_G-1$ are input.

In order to efficiently perform the inverse fast Fourier transform, the sorter 103-1 can be adequately structured so that the amount of processing required for inverse Fourier transforming is reduced in that increasing the amount of calculations by a factor equal to the number of partitions is avoided.

Figure 7:
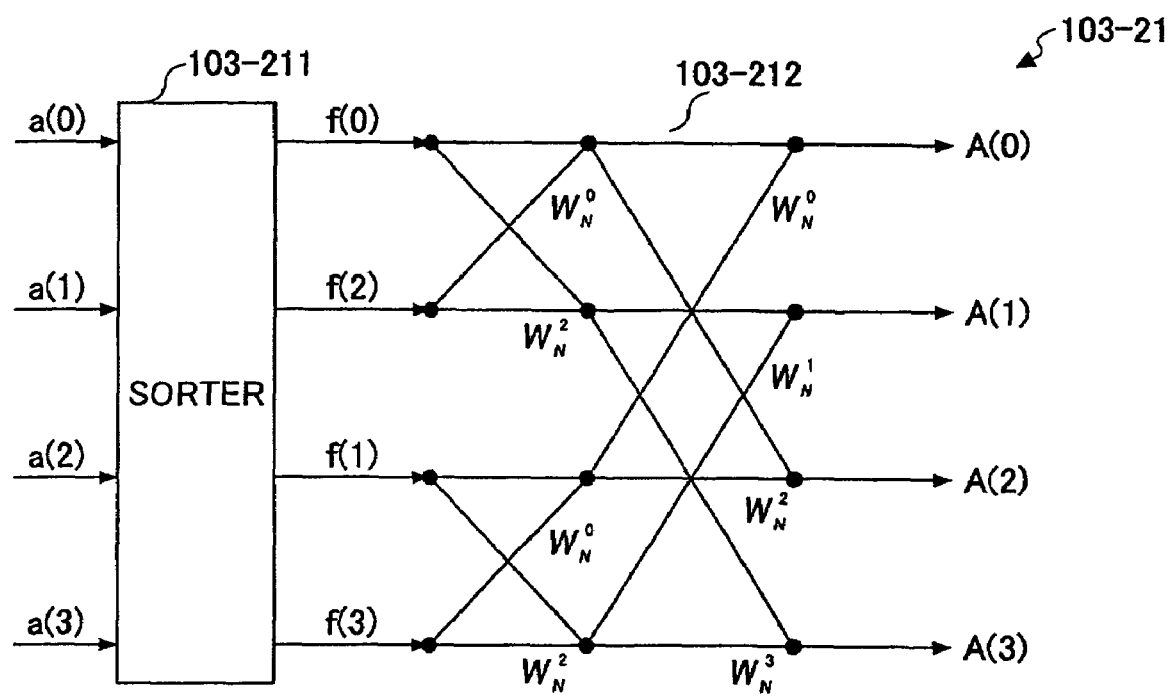
FIG. 7 is an explanatory diagram explaining a partitioned IFFT in the transmitter according to the first embodiment of the present invention.

Next, the partitioned IFFT unit 103-2 is explained with reference to FIG. 7. Only the IFFT 103-21 is explained as a representative example. Other IFFTs 103-22~103-24 are the same as the IFFT 103-21, and their explanation is omitted.

The IFFT 103-21 comprises a sorter 103-211 and an operator 103-212. The sorter 103-211 receives complex signals and inputs the received complex signals to the operator 103-212. The operator 103-212 performs inverse Fourier transform on the received complex signals. For example, the IFFT 103-21 performs normal 4 point inverse Fourier transform. $W_N^n$ represents a rotation factor, and $W_N^n=\exp(j(2\pi/N)n)$, where j is the imaginary unit. N=4 here in this embodiment.

Instead of the separated sorters, there may be provided an integrated sorter which performs both the sorting functions of the sorter 103-1 and the sorter 103-211 in each IFFT 103-21~24. In this manner, the processing can be more efficiently done.

Next, the multiple discrete signal generator unit 103-3 is explained with reference to FIGS. 8A and 8B. The multiple discrete signal generator unit 103-3 generates a designated number of samples of discrete signals from the outputs of the plural IFFTs 103-21~24.

The multiple discrete signal generator unit 103-3 receives N input signals and generates 2N output signals. The nth input is output as the nth output signal and the (n+N)th output signal. The multiple discrete signal generator unit 103-3 receives 4 point inputs and outputs 8 point outputs here in this embodiment.

Figure 8A:
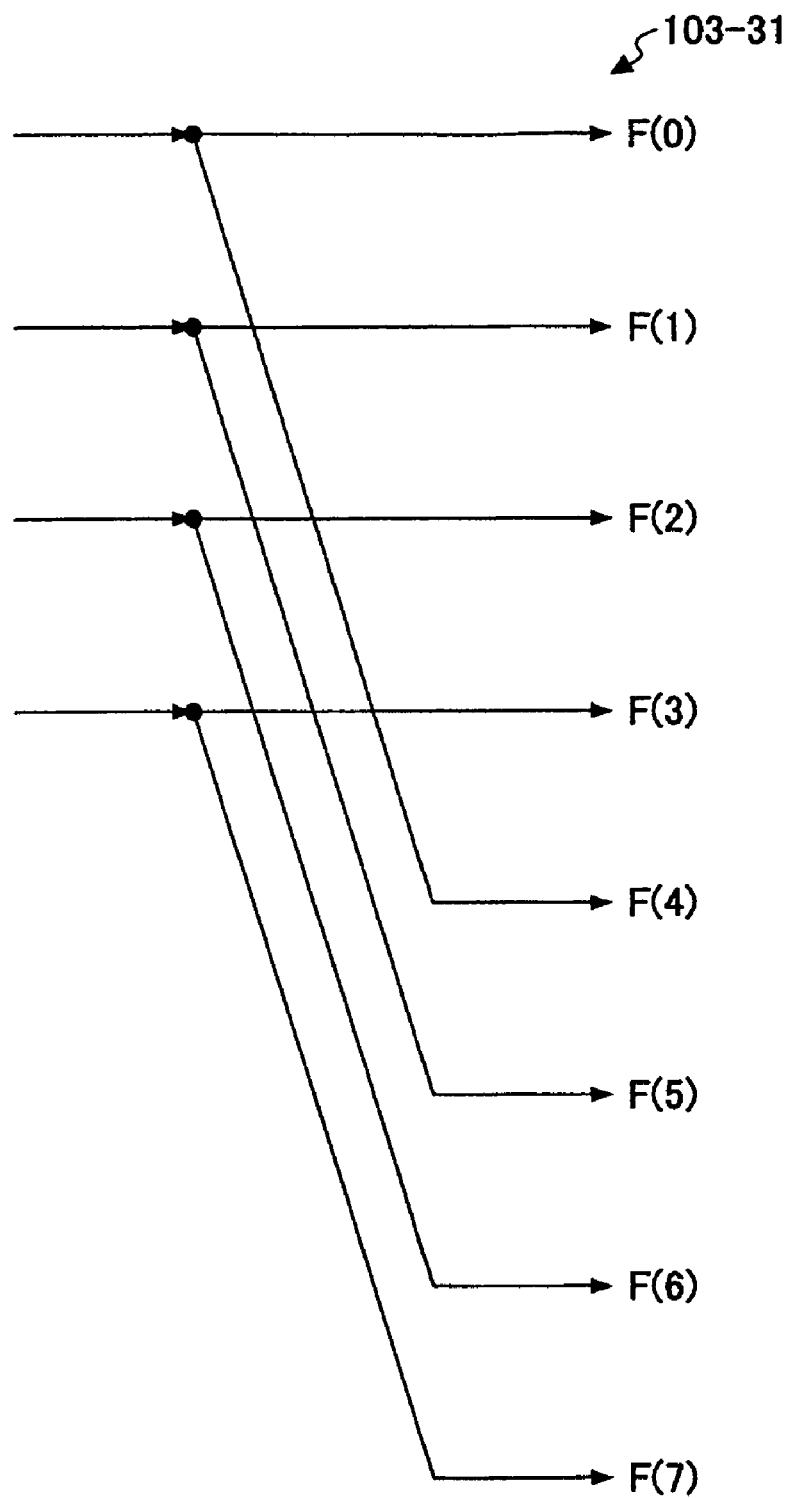
FIG. 8 is an explanatory diagram explaining a multiple discrete signal generator in the transmitter according to the first embodiment of the present invention.
Figure 8B:
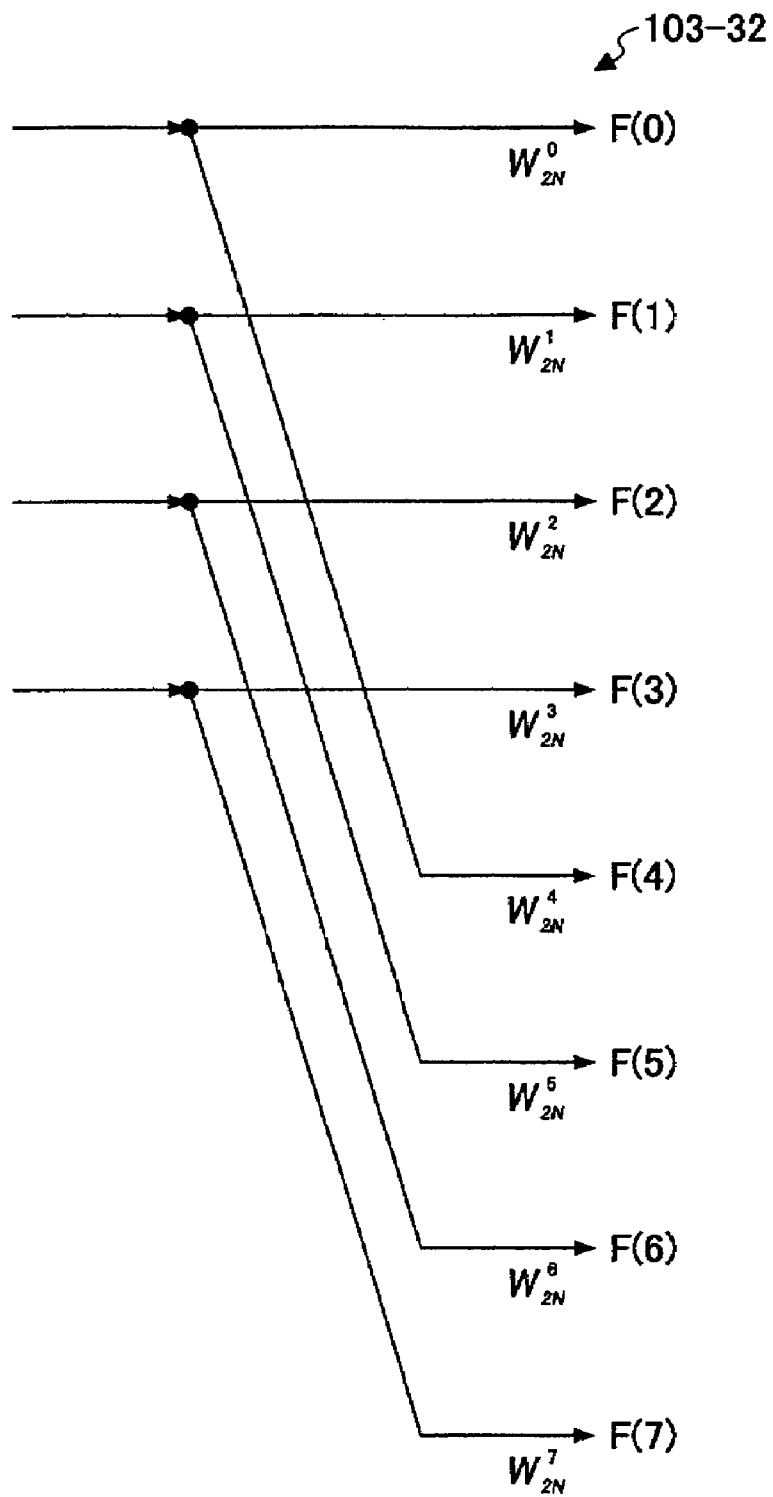

In a case where the input signals to the multiple discrete signal generator unit 103-3 are even harmonics of the output signals from the multiple discrete signal generator unit 103-3, the nth input is output as is as the nth output and the (n+N)th output, as shown in FIG. 8A.

In a case where the input signals to the multiple discrete signal generator unit 103-3 are odd harmonics of the output signals from the multiple discrete signal generator unit 103-3, the nth input is output weighted by $W_{2N}^n$ as the nth output, and output weighted by $W_{2N}^{n+N}$ as the (n+N)th output. Herein $W_{2N}^n=\exp(j(2\pi/2N)n)$, $W_{2N}^{n+N}=\exp(j(2\pi/2N)(n+N))$. In this manner, weighting processing can be done efficiently.

For example, the input signals to the multiple discrete signal generator (even harmonics) 103-31 correspond to the even harmonics of the outputs thereof. The zero-th input is output as is as the zero-th output signal and the fourth output signal, as shown in FIG. 8A. Similarly, the 1st input is output as is as the 1st output signal and the fifth output signal, the 2nd input is output as is as the 2nd output signal and the sixth output signal, and the 3rd input is output as is as the 3rd output signal and the seventh output signal. The multiple discrete signal generator (even harmonics) 103-33 performs in a similar manner.

The input signals to the multiple discrete signal generator (odd harmonics) 103-32 correspond to the odd harmonics of the outputs thereof. The zero-th input is output weighted by $W_{2N}^0$ as the zero-th output signal and output weighted by $W_{2N}^4$ as the fourth output signal, as shown in FIG. 8B.

Similarly, the 1st input is output weighted by $W_{2N}^1$ as the 1st output signal and output weighted by $W_{2N}^5$ as the fifth output signal, the 2nd input is output weighted by $W_{2N}^2$ as the 2nd output signal and output weighted by $W_{2N}^6$ as the sixth output signal, and the 3rd input is output weighted by $W_{2N}^3$ as the 3rd output signal and output weighted by $W_{2N}^7$ as the seventh output signal. The multiple discrete signal generator (odd harmonics) 103-34 performs in a similar manner. In this manner, by performing the normal inverse Fourier transform in a divided or partitioned way, increasing the calculation amount by a factor equaling the number of divisions can be prevented.

Figure 3:
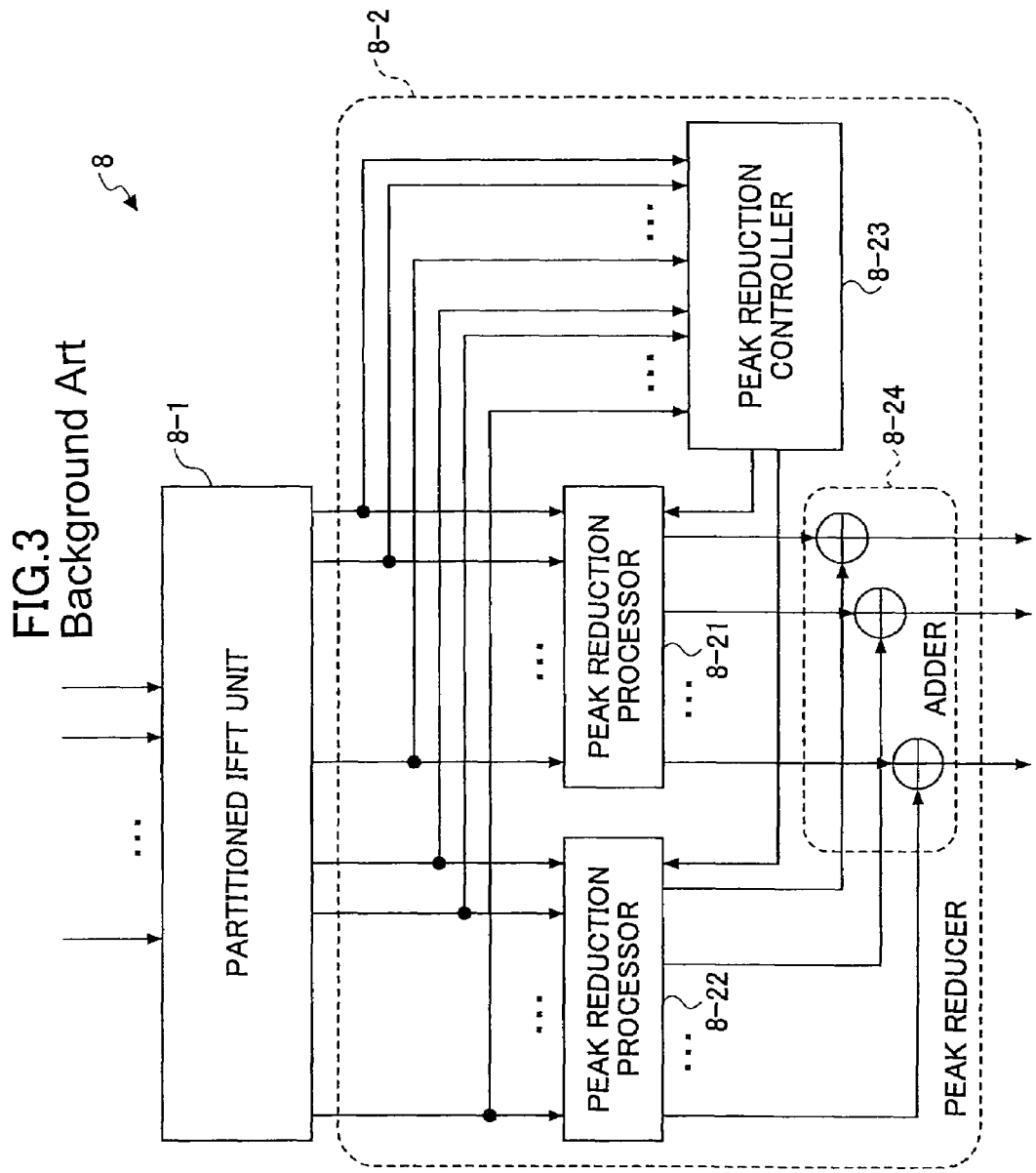
FIG. 3 is a block diagram of a low peak IFFT unit.

Structures of the peak reducers 103-41, 103-42 are similar to that of the peak reducer 8-2 shown in FIG. 3, and their explanation is omitted.

The structure of the multiple discrete signal generator unit 103-5 is similar to that of the multiple discrete signal generator unit 103-3, and its explanation is omitted. The structure of the peak reducer 103-6 is similar to that of the peak reducers 103-41, 42, and its explanation is omitted.

Figure 9A:
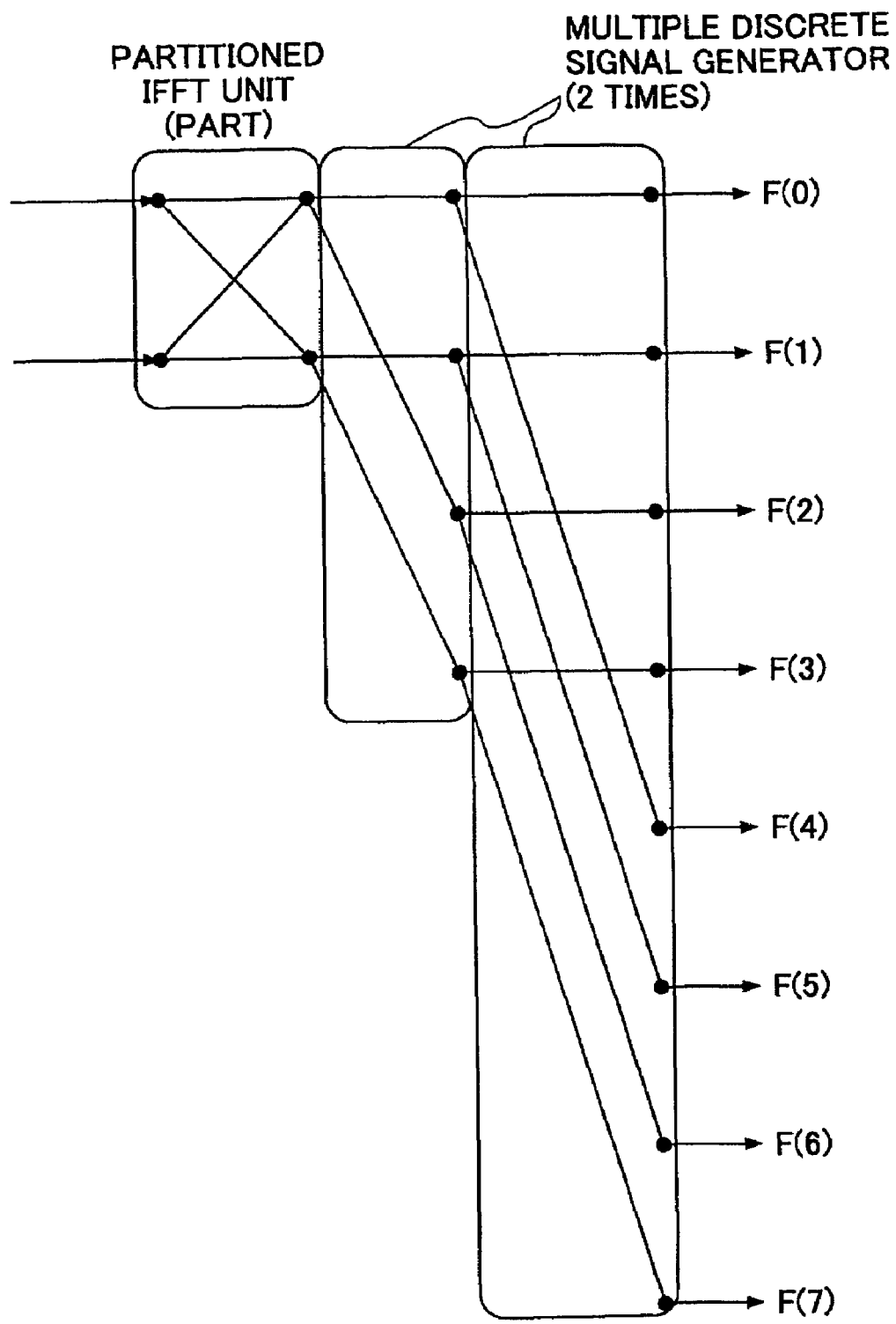
FIG. 9 is a schematic diagram explaining a partitioned IFFT and a multiple discrete signal generator in a transmitter.
Figure 9B:
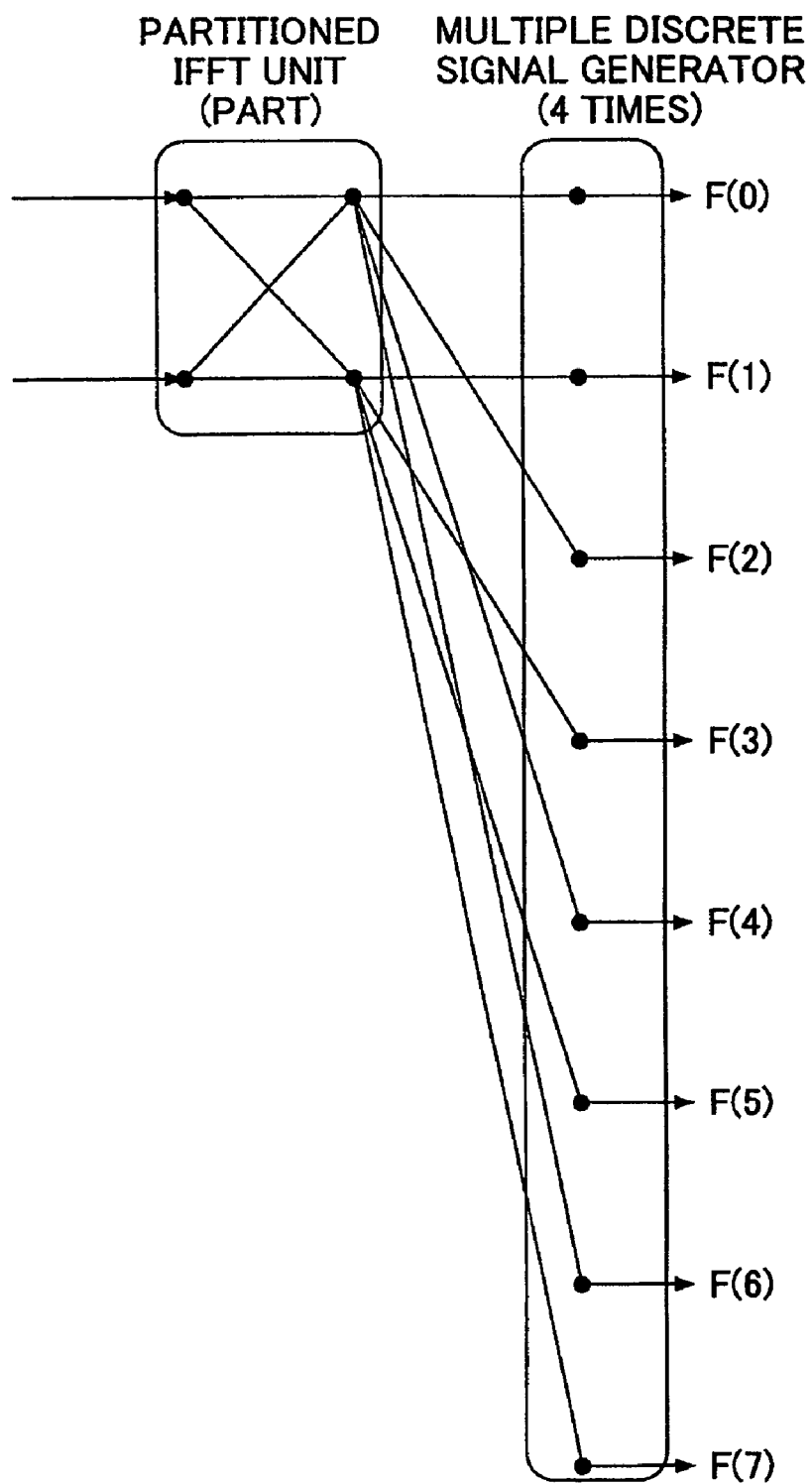

In this embodiment, the end stage of the partitioned IFFT unit is applied as is to generate multiple discrete signals, as shown in FIG. 9A. On the other hand, in the prior art, the output signals from the partitioned IFFT unit are weighted by pre-calculated weights to generate the final signals by one time multiplication (See Non-patent Document #2).

Figure 10A:
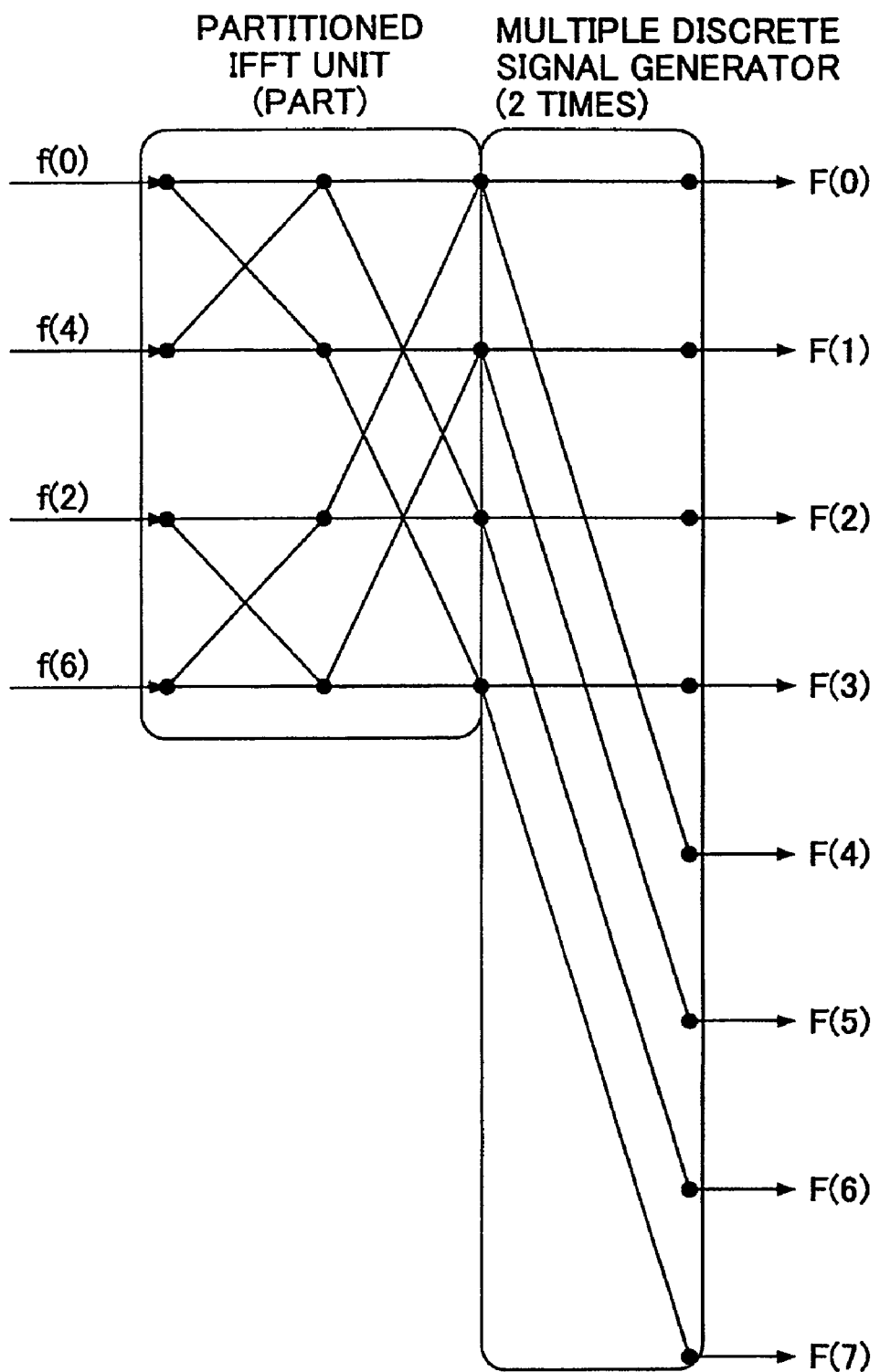
FIG. 10 is a schematic diagram explaining a partitioned IFFT and a multiple discrete signal generator in the transmitter according to the first embodiment of the present invention.
Figure 10B:
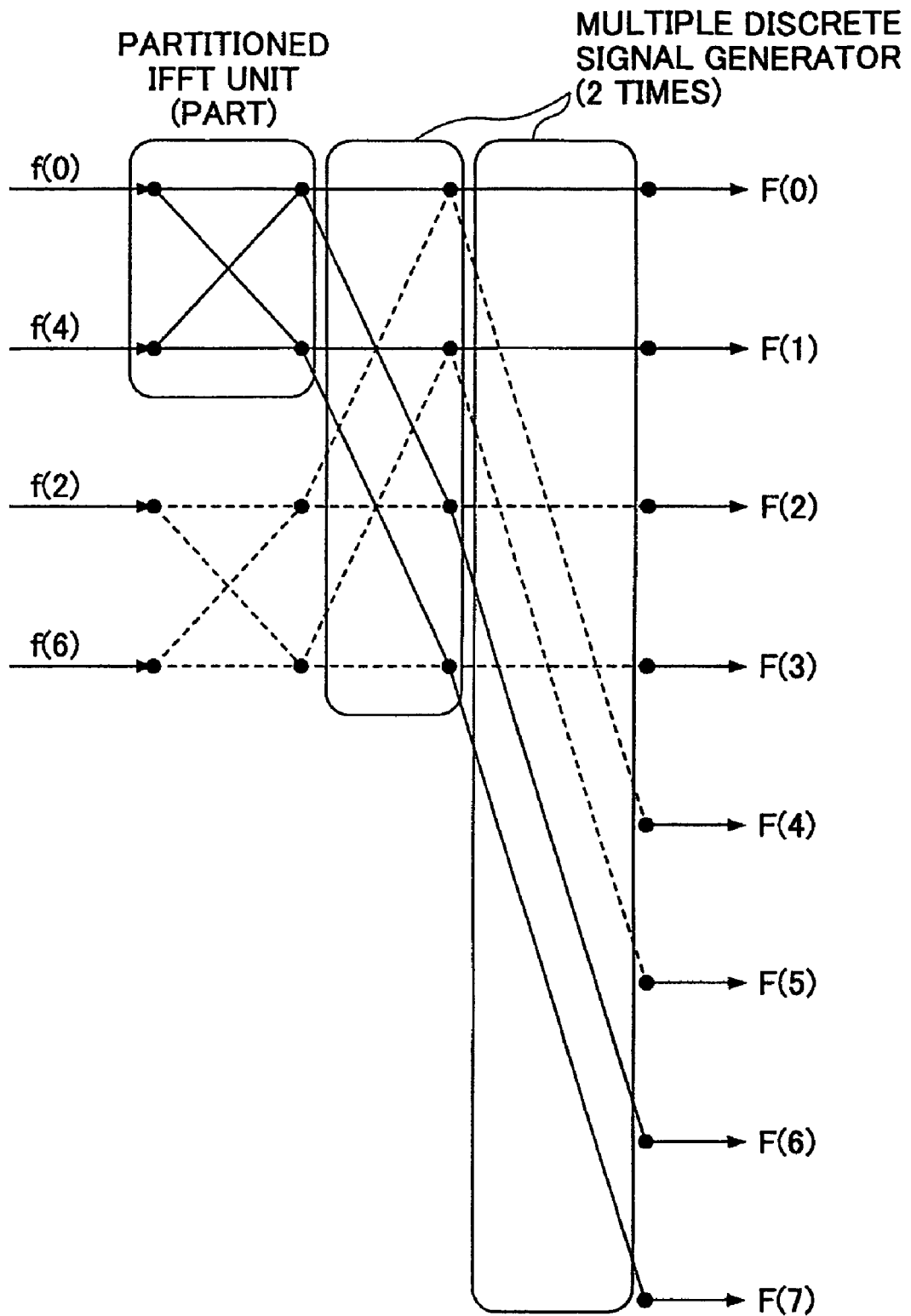

In this embodiment, in the case of variable group numbers, the multiple discrete signal generators need to generate a number of discrete signals multiplied by a factor equaling the number of groups. With regard to this point, in the prior art, weights for all expected discrete signals must be previously stored, because coefficients are different from four times the discrete signals to eight times the discrete signals. On the other hand, in this embodiment, since the same weights can still be used even after the number of groups varies, the number of weights to be stored can be reduced. The same weights are used in the partitioned IFFT unit in FIG. 10A and used in the multiple discrete signal generators in FIG. 10B. Processing that is not done simultaneously is shown by dotted lines in FIG. 10B.

In this embodiment, the peak reduction can be realized by a reduced processing amount, since the multiple discrete signal generators and the peak reducers are arranged alternately. For example, in FIG. 6, if the input to the peak reducer 103-41 is 8 symbols×2, then the input to the peak reducer 103-6 becomes 16 symbols×2.

In peak reducers, generally, peak reduction processing and its control become complicated depending on the number of input symbols and the number of weights. This embodiment can reduce the amount of calculation since some of the weights can be determined based on fewer input numbers.

With regard to the peak reduction processing control amount, when weights are determined by multiple stages with the prior structure, by monitoring some of the inputs to the peak reducers and determining the peak reduction processing method, peak reduction processing can be controlled in a manner similar to this embodiment.

Group number variation can be realized by making some of the peak reducers inactive, that is, by not performing circulation shift and weight multiplication by PTS, but by performing addition only.

In the above embodiment, the input sub-carriers are divided or partitioned into four groups for IFFT. The number of division/partition can be 2 to the Xth power. Inverse Fourier transform can be freely divided or partitioned within this limitation.

As for two stage partitioned IFFT units, when converting from $N_{FFT}/4$ point to $N_{FFT}/2$ point, input signals correspond to odd harmonics of output signals. When converting from $N_{FFT}/2$ point to $N_{FFT}$ point, input signals correspond to even harmonics of output signals.

Next, operation of a transmitter according to a second embodiment of the present invention is explained below.

A transmitter structure itself according to this embodiment is the same as in the first embodiment explained with reference to FIG. 5, and therefore its explanation is omitted.

In the transmitter 100 according to this embodiment, when a part of the bandwidth is assigned to users, transmission signals can be efficiently generated by applying the above embodiment.

More specifically, sub-carriers input to each IFFT are assigned to user bandwidth in the respective sub-carrier group. In this manner, processing for other unused sub-carriers can be easily omitted.

Figure 11:
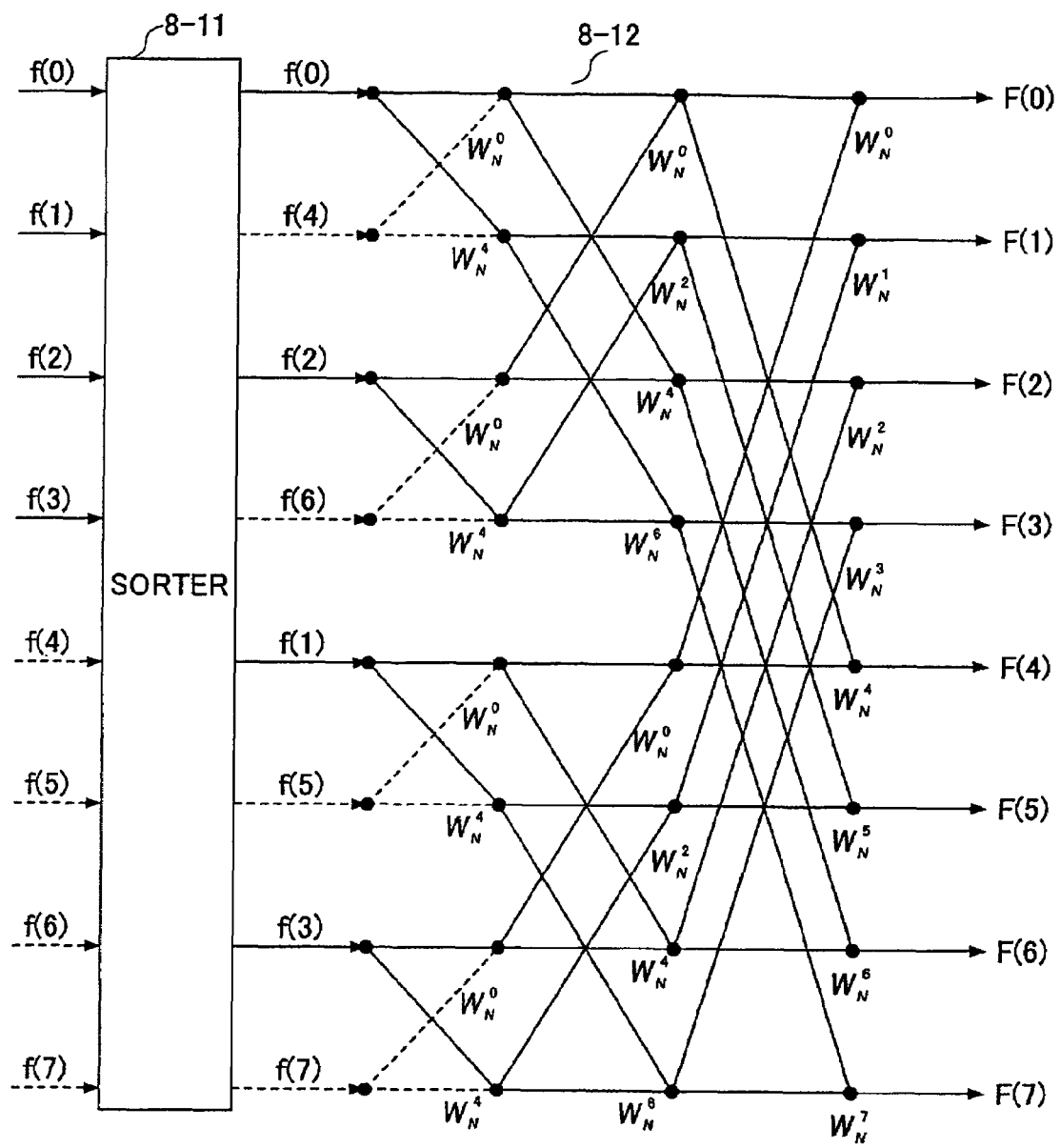
FIG. 11 is an explanatory diagram explaining processing in a low peak IFFT.
Figure 12:
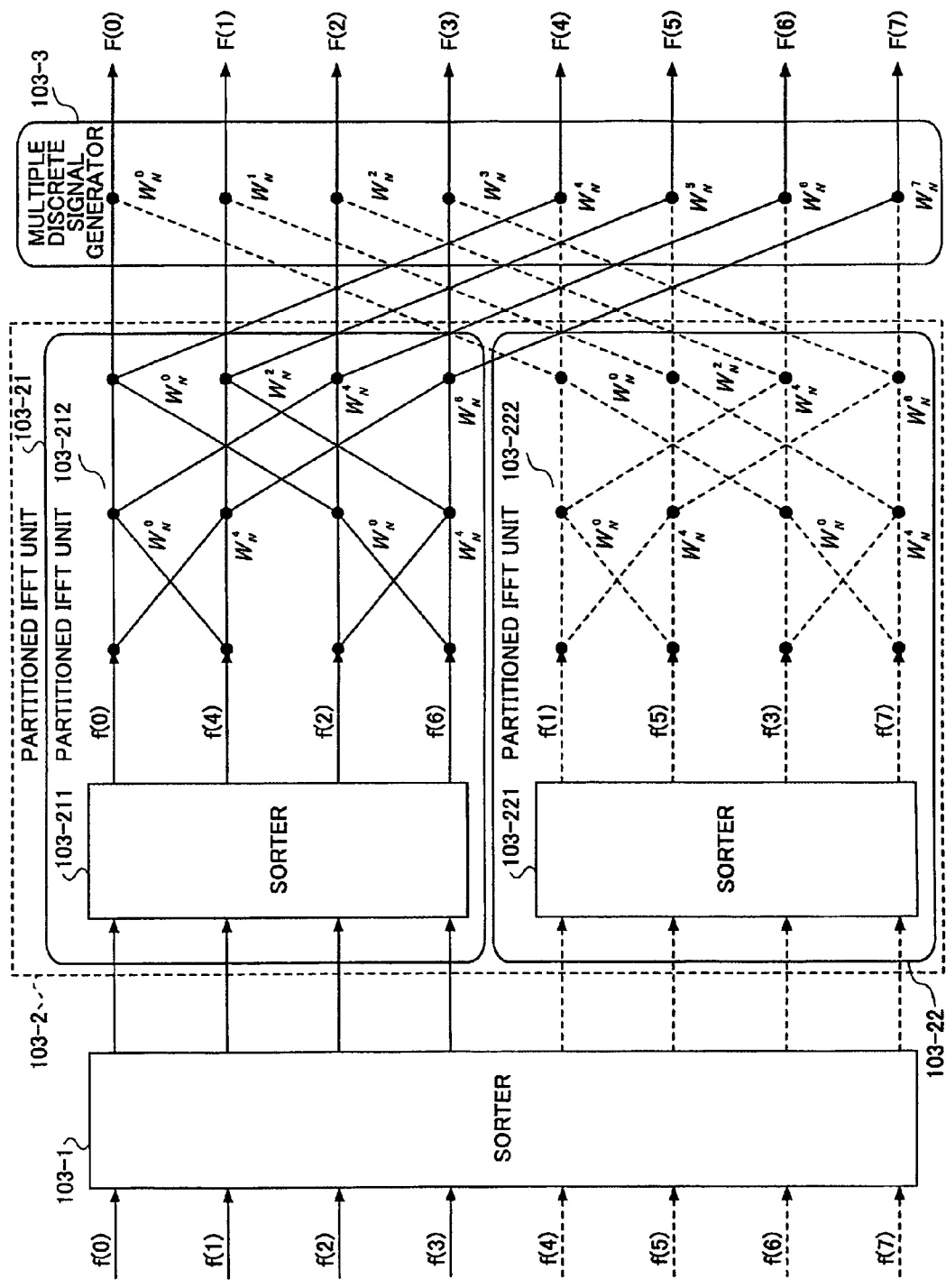
FIG. 12 is an explanatory diagram explaining processing in a low peak IFFT in a transmitter according to a second embodiment of the present invention.

The partitioned IFFT unit to which the sub-carriers are assigned according to this embodiment is explained with reference to FIG. 12. FIG. 11 shows a prior assigning method. In both FIGS. 11 and 12, dotted lines show operations that can be omitted. FIG. 11 shows that there are fewer operations that can be omitted, which operations exist in a dispersed manner. Therefore, it is not easy to control omission of operations.

A partitioned IFFT 103-2 according to this embodiment is explained with reference to FIG. 12. In FIG. 12 there are many omittable operations and they are not dispersed. Therefore it is easy to control omission of operations. Operation of the partitioned IFFT 103-22 can be omitted, for example.

Peak reducers to which assigned sub-carriers are not input can be made inactive. In this manner, it is possible to reduce power consumption of peak reducers to which no sub-carriers are input.

When peak reducers are made inactive, it is possible to make peak reducers inactive in order from rear to front. In this manner, the power consumption can be further reduced.

Considering frequency-selective fading, adjacent sub-carriers have high correlation, and therefore have similar channel gain dropping characteristics. In this embodiment, a bandwidth assigned to a user has a variety of frequency elements spread over the occupied band, and it is easy to achieve frequency diversity advantage.

When a base station uses the assigning method according to this embodiment and the peak reducing method mentioned in the above embodiment, that is, when sub-carriers assigned by the partitioned IFFT 103-2 to each user are the same as sub-carriers peak-suppressed by the peak reducer 103-4, each user can perform reception processing without any additional peak suppression processing. In other words, a receiver can receive without additional peak reducing processing.

According to the embodiments of the present invention, the IFFT can be divided or partitioned without increasing the amount of processing. Use of this IFFT dividing method makes it possible to efficiently realize the peak reducing method in a transmitter. When plural users share a bandwidth and each user uses some of the sub-carriers to communicate, it is possible to generate transmission signals with a reduced calculation amount.

Figure 4:
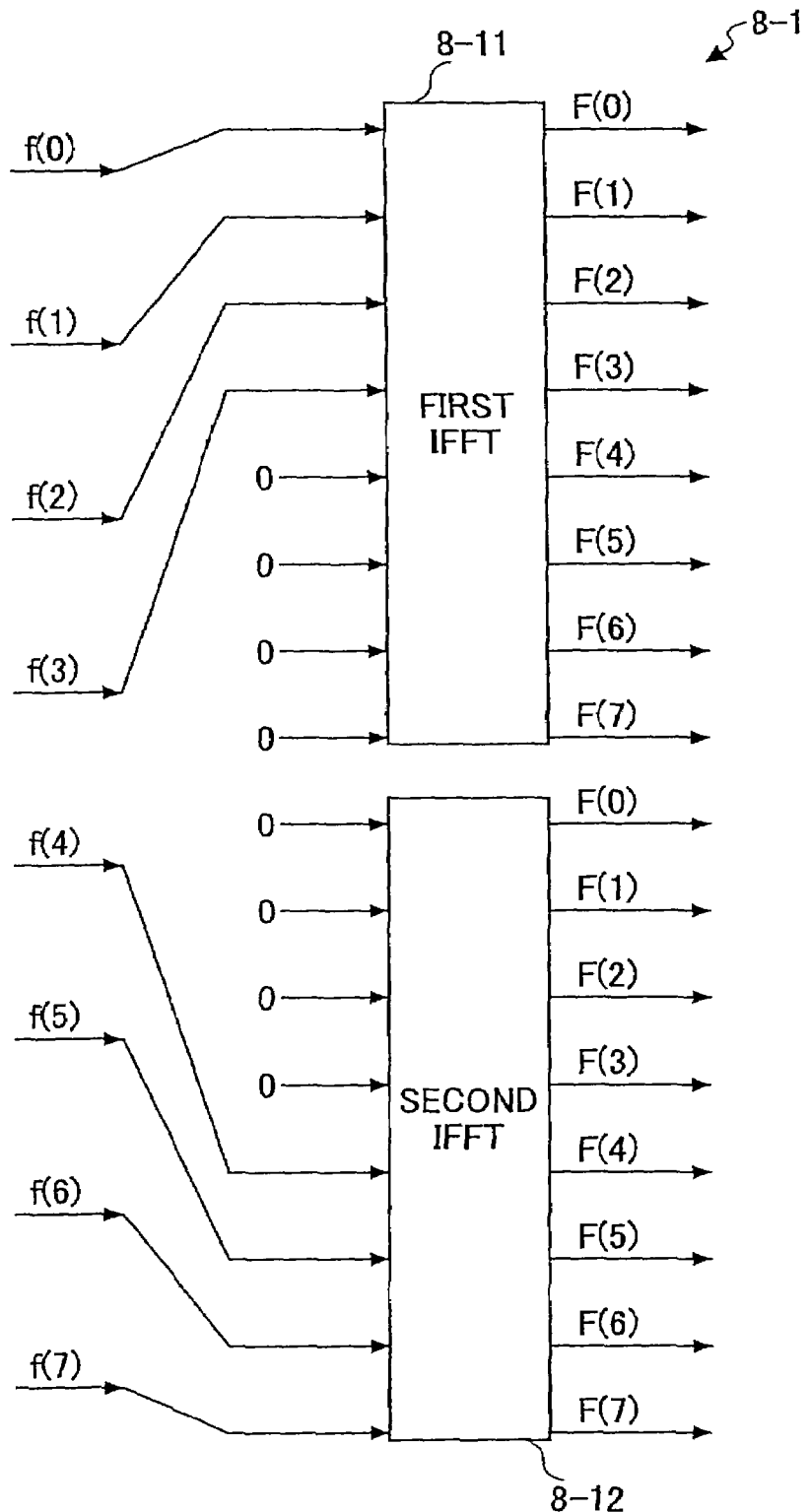
FIG. 4 is a schematic diagram of partitioned IFFTs.

Compared with the structure shown in FIG. 4, equivalent peak reduction capability can be obtained without any reception characteristics degradation due to the peak reduction.

INDUSTRIAL APPLICABILITY

A transmitter and receiver according to the present invention can be applied to a variety of radio communications.

The present application is based on Japanese Priority Application No. 2004-155031 filed on May 25, 2004 with the Japanese Patent Office, the entire contents of which are hereby incorporated by reference.

What is claimed is:

1. An OFDM transmitter, comprising:
    a sorter for sorting a plurality of input complex signals $N_{FFT}$ and partitioning said input complex signals into plural groups;
    a plurality of IFFTs for performing inverse Fourier transform on the input complex signals in groups;
    a first plurality of multiple discrete signal generators for generating a designated number of discrete signals from outputs of the IFFTs;
    a first peak reducer for performing peak reduction, based on outputs from the first plurality of multiple discrete signal generators;
    a second plurality of multiple discrete signal generators for generating a designated number of discrete signals from outputs of the first peak reducer; and
    a second peak reducer for performing peak reduction, based on outputs from the second plurality of multiple discrete signal generators.

2. The transmitter as claimed in claim 1, wherein:
when the sorter divides the input $N_{FFT}$ complex signals ($N_{FFT}$ is an integer larger than 1) into $N_G$ groups ($N_G$ is Z (Z is an integer larger than 2) to the power of an integer), the sorter sorts the complex signals by defining a remainder operator Mod (sub-carrier number, ($Z^X$)) as a key having the Xth priority (X is a natural number from 1 to $\log_Z(N_G)$) and defining the sub-carrier number as a key having the $(\log_Z(N_G))$th priority; and
the nth IFFT (n is a natural number) of the IFFTs has $N_{FFT}/N_G$ point input terminals, to which complex signals from $(n-1)N_{FFT}/N_G$ to $nN_{FFT}/N_G-1$ are input.

3. The transmitter as claimed in claim 1, wherein:
the multiple discrete signal generator receives N input signals (N is a natural number) and generates 2N output signals,
in a case where the nth input signals to the multiple discrete signal generator are even harmonics of the output signals from the multiple discrete signal generator, the nth input is output as is as the nth output and the (n+N)th output; and
in a case where the nth input signals to the multiple discrete signal generator are odd harmonics of the output signals from the multiple discrete signal generator, the nth input is output weighted by $W_{2N}^n$ as the nth output, and output weighted by $W_{2N}^{n+N}$ as the (n+N)th output (wherein $W_{2N}^n = \exp(j(2\pi/2N)n)$, $W_{2N}^{n+N} = \exp(j(2\pi/2N)(n+N))$).

4. The transmitter as claimed in claim 1, wherein:
the IFFTs assign sub-carriers to plural users in groups.

5. The transmitter as claimed in claim 4, wherein:
peak reducers receiving no assigned sub-carrier are made inactive.

6. The transmitter as claimed in claim 5, wherein:
the peak reducers are made inactive in order from rear to front.

7. A transmission control method in an OFDM transmitter, comprising the steps of:
sorting a plurality of input complex signals;
partitioning the sorted complex signals into plural groups;
performing inverse Fourier transform on the input complex signals in groups;
generating a first designated sample number of discrete signals from outputs of the inverse Fourier transform;
performing a first peak reduction, based on the first designated sample number of discrete signals;
generating a second designated sample number of discrete signals from the first peak reduced signals; and
performing a second peak reduction, based on the second designated sample number of discrete signals.

* * * * *